United States Patent Office 3,011,811
Patented Dec. 5, 1961

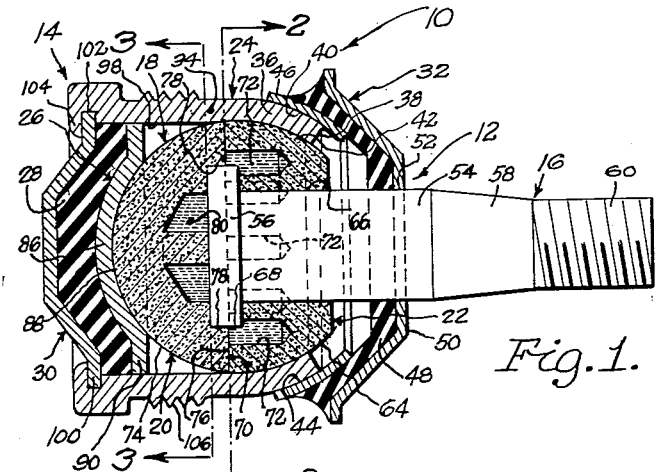

3,011,811
COMPOSITE SELF-LUBRICATING BALL JOINT
John Haller, 18500 Sheldon Road, Northville, Mich.
Filed Sept. 18, 1957, Ser. No. 684,767
3 Claims. (Cl. 287—87)

This invention relates to ball joints and, in particular, to composite ball joints, the components of which are made up of different materials.

One object of this invention is to provide a composite self-lubricating ball joint wherein the ball-headed oscillating member of the ball joint is composed in part of solid metal and in part of porous sintered powdered material, such as sintered powdered metal or sintered powdered nylon, with a resulting ease of assembly and with a self-contained lubricant well providing continuous lubrication throughout the entire life of the ball joint, and providing an automatically-metered flow of such lubricant through the pores of the powdered metal components.

Another object is to provide a composite self-lubricating ball joint of the foregoing character in which the ball-headed oscillating member is composed of a solid metal headed stud and one or more ball component members of sintered powdered material through which the stud is inserted, one or more of the ball component members having a self-contained lubricant well therein.

Another object is to provide a composite self-lubricating ball joint of the foregoing character wherein the ball joint is also provided with a socket member of sintered powdered metal likewise having a lubricant well therein for providing additional lubrication.

Other objects and advantages of the invention will become apparent during the course of the following description of the accompanying drawings, wherein:

FIGURE 1 is a central vertical section through a composite ball joint employing a compound ball member of porous sintered powdered material, according to one form of the invention, shown for purposes of example as an automobile ball joint;

FIGURE 2 is a cross-section taken along the line 2—2 in FIGURE 1, looking to the right;

FIGURE 3 is a cross-section taken along the line 3—3 in FIGURE 1, looking to the left;

FIGURE 4 is a central vertical section through a composite ball joint which is a modification of the ball joint shown in FIGURE 1; and FIGURE 5 is a central vertical section through a composite ball joint which is a further modification of the ball joint shown in FIGURE 1.

Referring to the drawings in detail, FIGURES 1 to 3 inclusive show a composite ball joint, generally designated 10, according to one form of the invention as consisting generally of a compound stud-and-ball unit, generally designated 12, mounted in a socket structure, generally designated 14. The stud-and-ball unit 12, as its name suggests, consists of a bolt-like stud 16 of steel or the like having a compound ball head, generally designated 18, composed of forward and rearward ball components 20 and 22 respectively of porous sintered powdered material, such as powdered metal. The stud-and-ball unit 12 will be described in more detail below, after description of the socket structure 14 in detail.

The socket structure 14 consists of a casing 24, preferably of metal and containing a socket element 26 resiliently urged into engagement with the upper ball component 20 by a resilient member 28. The latter may be made of rubber or similar material, as shown, or may consist of a spring similar to that shown in FIGURES 4 and 5. The resilient member 28 is in turn held in place by a cover disc 30, and the outer rearward surface of the casing is engaged by an annular resilient sealing cup, generally designated 32, encircling the stud 12 as described in more detail below.

The casing 24 is of approximately cylindrical form, at least in its outer end portion 34, but has a partially spherical rearward portion 36 containing an aperture 38 through which the stud 12 passes and also having outer and inner partially spherical surfaces 40 and 42 respectively. The outer surface 40 is loosely and slidably engaged by the inner surface 44 of an annular partially spherical metal shell 46 forming the forward part of the sealing cup 32. The forward surface of the shell 46 is bonded to a convexo-concave resilient layer 48. Bonded to the rearward surface of the resilient layer 48, which is of rubber or rubber-like material, is a cupped washer 50 likewise preferably of metal and of approximately frusto-conical shape with a central hole 52 through which the main shank portion 54 of the stud 16 passes.

The main shank portion 54 terminates at its forward end in an annular head 56 and is joined by a tapered portion 58 at its rearward end to a reduced diameter threaded end portion 60. The tapered portion 58 and rearward end of the main shank portion 54 are intended to receive other machine elements forming no part of the present invention, and the threaded portion 60 is threaded into one of these elements to retain the parts in assembly upon the shank portions 54 and 58, as well as to hold the resilient cupped structure 32 against the rearward end of the casing 24.

The internal partially spherical surface 42 of the rearward portion 36 of the casing 24 is rockably engaged by a partially spherical surface 64 on the exterior of the rearward ball head component 22. The component 22 is approximately a truncated hemisphere of sintered powdered metal, such as powdered iron, steel or bronze, and containing a radial bore 66 which snugly but slidably receives the main shank portion 54 of the stud 16. The component 22 also has a countersink or depression 68 which is approximately half the depth of the thickness of the head 56 and of substantially the same size so as to receive the head 56 and cause approximately half of it to project from the forward surface 70 of the rearward ball component 22. Formed in the rearward ball component 22 and spaced circumferentially around the bore 66 therein are multiple recesses 72 forming lubricant wells extending rearwardly substantially parallel to the axis of the stud 16 from the forward surface 70 of the component 22.

The forward ball component 20 is also of approximately hemispherical shape with an outer or forward hemispherical surface 74 and a rearward approximately flat diametral surface 76 which is engageable with the approximately diametral forward surface 70 of the rearward ball component 22. Extending into the forward ball component 20 from the rearward surface 76 thereof is a countersink or annular recess 78 of a depth sufficient to snugly receive the remainder of the thickness of the head 56 of the stud 16 when the head 56 is seated in the countersink 68, so that the diametral surfaces 70 and 76 are in form abutting engagement. Extending inwardly and forwardly from the bottom of the recess 78 is an annular lubricant well 80 surrounding a central boss 82, the forward end surface 84 of which engages the head 56 of the stud 16.

The socket element 26 has a central convexo-concave portion 86 containing a spherical inner surface 88 of substantially the same radius of curvature as the ball head surface 74 by which it is rockably engaged. The central portion 86 is encircled by an annular radial flange 90 the periphery of which slidably engages a cylindrical bore 98 in the forward portion 34 of the casing 24. The resilient member 28 is of convexo-concave form, with its rearward surface preferably bonded to the socket element 26 and with its forward frusto-conical surface preferably bonded to the inner or rearward surface of the cover disc 30 which is likewise of approximately frusto-conical shape with an annular peripheral flange 100 received within an annular recess 102 in the forward or outer end of the casing 24. The metal at the forward end of the casing 24 is spun or otherwise moved inwardly as at 104, after assembly, to hold the cover disc 30 and its associated elements in assembly. The forward portion 34 of the casing 24 is provided with an external threaded portion 106 by which it is secured to an internally-threaded part of the associated front wheel suspension structure (not shown).

In the operation of the ball joint 10 with the lubricant wells 72 and 80 filled with oil or other lubricant and with the parts assembled as shown in FIGURE 1, lubricant by means of capillary attraction seeps through the pores of the sintered powdered metal ball head valves or hemispheres 20 ad 22 and reaches the outer spherical surfaces 74 and 64 respectively thereof where it lubricates the coacting concave spherical surfaces 88 and 42 respectively. As a consequence, when the ball-and-stud unit 12 rocks relatively to the socket structure 14, the convex and concave surfaces 74, 64 and 88, 42 are thus supplied with a metered flow of lubricant which is adequate to lubricate the coacting surfaces satisfactorily without wasting lubricant. At the same time, the lubricant wells 72 and 80 have a lubricant capacity which is sufficient to lubricate the entire assembly properly for substantially the entire working life of the ball joint 10. The resilient layers 48 and 28 urge their respective metal parts 44 and 26 into engagement with their coacting spherical surfaces 40 and 88 so as to prevent rattling and to constantly take up any excessive clearance between the parts.

The modified composite ball joint, generally designated 110, shown in FIGURE 4 has a ball-and-stud unit 112 and a socket structure 114, certain components of which are so generally similar to corresponding components of the ball joint 10 that they are designated with the same reference numerals and hence require no duplication of description. These similar components designated with the same reference numerals include the casing 24, rearward ball head component 22, the socket element 26, the cover disc 30 and the resilient sealing cup 32. The central portion of the socket element 26 and the closure disc 30 of the ball joint 110 of FIGURE 4 are both slightly shallower than their corresponding components in the ball joint 10 of FIGURE 1, but these mere slight dimensional differences are not considered sufficient to justify a repetition of the description of their construction given above.

The ball-and-stud unit 112 of the modified ball joint 110 has a slightly modified stud 113 which, in addition to the straight and tapered shank portions 115 and 116 and the threaded end portion 118, has an annular head 120 with a central bore 122 forming a well extending longitudinally into the straight shank portion 115. Inserted in the bore 122 during assembly is the correspondingly-shaped shank 124 of an outer sintered powdered metal ball head half, generally designated 126, having a partially spherical head 128 with a spherical surface 130 thereon. The shank 124 has a bore 132 extending inward from the end thereof and forming an addition to the oil well formed by the bore 122. The shank 124 of the head half 126 is shorter than the depth of the bore 122 to provide additional volume to the lubricant well formed thereby. As in the case of the ball joint 10 of FIGURES 1 to 3 inclusive, the ball head half 126 is yieldably engaged by the socket member 26 slidably mounted in the bore 98 of the casing 24 and is urged thereagainst by a relatively flat spiral or conical spring 134 held in position by the closure disc 30, which in turn is secured in the casing 24 in the same manner as described in connection with FIGURE 1.

The assembly and operation of the modified ball joint 110 are generally similar to those of the ball joint 10. The lubricant wells 72 and 122 are filled with oil or other lubricant before the head 120 on the stud 113 is pushed into its countersink 68 and the shank 124 of the head half 126 is inserted in the bore 122. The remaining components are then inserted in the casing bore 98, the sealing cup 32 is applied and the ball joint 110 then installed in the machine in which it is used in the customary way. During operation, lubricant is supplied automatically in metered amounts from the lubricant wells or reservoirs 62 and 122 through the pores of the sintered powdered metal ball head halves or hemispheres 22 and 126 and reaches the outer spherical surfaces 64 and 130 thereof respectively, lubricating the coacting concave surfaces 42 and 88 respectively as the ball-and-stud unit 112 rocks relatively to the socket structure 114.

The further modified composite ball joint, generally designated 140, shown in FIGURE 5 also has a ball-and-stud unit, generally designated 142, and a socket structure, generally designated 144, certain components of which are so generally similar to corresponding components of the ball joint 10 that they are designated with the same reference numerals and hence require no duplication of description. These similar components designated with the same reference numerals include the rearward ball head component 22, the casing 24, the closure disc 30, and the resilient sealing cup 32.

The ball-and-stud unit 142 of the modified ball joint 140 has a further modified stud, generally designated 146, in addition to the straight and tapered shank portions 148 and 150 and the threaded end portion 152 has an annular head 154 with a dome 156 projecting forwardly therefrom and having a substantially spherical surface 158 thereon. The head 154, as before, is inserted in a countersink 68 in the rearward ball head half 22 which, also as before, has circumferentially-spaced lubricant wells 72, the mouths of which are covered by the head 154, which in this modification of the invention is, in effect, an annular flange.

The further modified ball joint 140 is also provided with a sintered powdered metal socket member 160 having a concave spherical surface 162 of curvature similar to the convex spherical surface 158 of the dome 156 so as to mate therewith. The socket member 160 is provided with lubricant holding means 164 which may consist either of a continuous annular lubricant well or circumferentially-spaced individual wells as in FIGURE 2, the well mouth or mouths being closed by a substantially flat closure disc 166, preferably of solid metal, which also serves as an abutment for one end of a spiral or conical spring 168, the opposite end of which abuts the inside of the cover disc 30.

The assembly and operation of the further modified composite ball joint 140 are also generally similar to those of the ball joints 10 and 110. The rearward ball head half 22 is inserted in the casing 24, followed by the stud 146 with the shank 148 passing through the bore 66 in the head half 22, lubricant being inserted in the lubricant well or wells 72 before the head or flange 154 is seated in its countersink 68. The sintered powdered metal socket member 160 is then inserted in the bore 98 of the casing 24, followed by the closure plate 166 after the lubricant well or wells 164 have been filled with lubricant. The spring 168 is then inserted, followed by the cover disc 30, and the rim portion 104 is spun or otherwise forced inward to lock the entire assembly in position. The ball joint 140 is then installed in the automobile or other machine in the usual way.

During operation, lubricant is supplied automatically in metered amounts from the lubricant wells or reservoirs 72 and 164 in the rearward head half 22 and socket member 160 respectively through the pores resulting from their sintered powdered metal construction, and reaches the coacting spherical surfaces 158 and 162 thereof as the ball-and-stud unit 142 rocks relatively to the socket structure 144. In the same manner, lubricant reaches the annular concave spherical surface 42 from the convex spherical surface 64 of the rearward ball half 22, lubri-

What I claim is:

1. A composite self-lubricating ball joint comprising a hollow casing structure having a bore therein containing a spherical concave surface portion, a rearward ball component disposed in said casing bore and having a convex spherical surface matingly engaging said spherical concave surface, said rearward ball component having a central bore therethrough, a stud member having a shank extending outwardly through said rearward ball component bore and through said casing structure bore to the exterior of said casing structure and connected to said rearward ball component, a forward ball component disposed in said casing structure forwardly of said stud member, a socket member disposed in said casing structure and having a spherical concave surface matingly engaging the spherical convex surface of said forward ball component, and resilient means yieldingly urging said socket member into engagement with said forward ball component, each of said ball components being of porous sintered powdered material and each having a lubricant well therein, said stud member having a head extending over and covering the mouth of the lubricant well in one of said ball components, whereby to provide continuous lubrication throughout the life of the ball joint and also to provide an automatically-metered flow of lubricant therefrom through the pores of the powdered metal components.

2. A composite self-lubricating ball joint, according to claim 1, wherein the rearward ball component containing the lubricant well has a recess disposed adjacent the mouth of the rearward ball component well and wherein said stud member head snugly engages said recess in closing relationship therewith.

3. A composite self-lubricating ball joint comprising a hollow casing structure having a bore therein containing a spherical concave surface portion, a rearward ball component disposed in said casing bore and having a convex spherical surface matingly engaging said spherical concave surface, said rearward ball component having a central bore therethrough, a stud member having a shank extending outwardly through said rearward ball component bore and through said casing structure bore to the exterior of said casing structure and connected to said rearward ball component, a forward ball component disposed in said casing structure forwardly of said stud member, a socket member disposed in said casing structure and having a spherical concave surface matingly engaging the spherical convex surface of said forward ball component, and resilient means yieldingly urging said socket member into engagement with said forward ball component, each of said ball components being of porous sintered powdered material and each having a lubricant well therein, said stud member having an axially-elongated bore forming a lubricant well in the forward end thereof and said forward ball component having a stem of shorter length than the length of said stud bore and seated in and extending only part-way into said stud bore, whereby to provide continuous lubrication throughout the entire life of the ball joint and also to provide an automatically-metered flow of lubricant therefrom through the pores of the powdered metal components.

References Cited in the file of this patent

UNITED STATES PATENTS

| | | |
|---|---|---|
| 2,077,582 | Peo | Apr. 20, 1937 |
| 2,369,091 | Venditty | Feb. 6, 1945 |
| 2,451,060 | Booth | Oct. 12, 1948 |
| 2,593,253 | Booth | Apr. 15, 1952 |
| 2,614,873 | Booth | Oct. 21, 1952 |
| 2,698,774 | Hailer et al. | Jan. 4, 1955 |
| 2,707,645 | Moskovitz | May 3, 1955 |
| 2,823,055 | Booth | Feb. 11, 1958 |
| 2,846,252 | Hervenar et al. | Aug. 5, 1958 |
| 2,857,190 | Moskovitz | Oct. 21, 1958 |
| 2,924,469 | Moskovitz | Feb. 9, 1960 |

FOREIGN PATENTS

| | | |
|---|---|---|
| 526,263 | Great Britain | Sept. 13, 1940 |